United States Patent
Mugnier

(10) Patent No.: US 12,551,805 B2
(45) Date of Patent: Feb. 17, 2026

(54) FERRIS WHEEL INSTALLATION COMPRISING A GUIDE STRUCTURE FOR GONDOLAS HAVING SLIDING BALL JOINTS

(71) Applicant: POMA, Voreppe (FR)

(72) Inventor: Jean-Francois Mugnier, Voreppe (FR)

(73) Assignee: POMA, Voreppe (FR)

( * ) Notice: Subject to any disclaimer, the term of this patent is extended or adjusted under 35 U.S.C. 154(b) by 869 days.

(21) Appl. No.: 17/808,530

(22) Filed: Jun. 23, 2022

(65) Prior Publication Data

US 2023/0001312 A1    Jan. 5, 2023

(30) Foreign Application Priority Data

Jun. 30, 2021 (FR) ..................... 2107098

(51) Int. Cl.
*A63G 27/02* (2006.01)
*F16C 33/58* (2006.01)

(52) U.S. Cl.
CPC .............. *A63G 27/02* (2013.01); *F16C 33/58* (2013.01); *F16C 2316/30* (2013.01)

(58) Field of Classification Search
CPC .. F16C 33/58; F16C 2316/30; F16C 2300/14; A63G 29/02; A63G 27/02; A63G 21/08; A63G 27/04; A63G 27/00
See application file for complete search history.

(56) References Cited

U.S. PATENT DOCUMENTS

| | | | |
|---|---|---|---|
| 8,777,762 B2 * | 7/2014 | Morand | A63G 29/02 472/44 |
| 8,807,042 B2 | 8/2014 | Vittoz et al. | |
| 2012/0260816 A1 * | 10/2012 | Vittoz | A63G 27/00 104/76 |
| 2022/0001287 A1 * | 1/2022 | Desflammes | A63G 27/02 |

FOREIGN PATENT DOCUMENTS

| | | | | |
|---|---|---|---|---|
| CN | 115531891 A | * | 12/2022 | ............ A63G 27/00 |
| CN | 220193967 U | * | 12/2023 | |
| DE | 476892 C | | 5/1929 | |
| FR | 3088014 A1 | | 5/2020 | |
| JP | 2002143569 A | | 5/2002 | |
| JP | 2002355446 A | | 12/2002 | |
| JP | 2010005316 A | | 1/2010 | |
| WO | 2012/140330 A1 | | 10/2012 | |

OTHER PUBLICATIONS

European Search Report mailed Nov. 14, 2022, in connection with European Patent Application No. 22177594, 4 pgs. (including translation).

* cited by examiner

*Primary Examiner* — Joseph S Del Sole
(74) *Attorney, Agent, or Firm* — Chiesa Shahinian & Giantomasi PC

(57) ABSTRACT

A gondola of a Ferris wheel installation is connected to a wheel rim structure of the Ferris wheel by means of a guide structure comprising at least one bearing that is connected to the wheel rim structure by two sliding ball joints which have slide axes that are parallel to one another and spaced apart from one another.

15 Claims, 4 Drawing Sheets

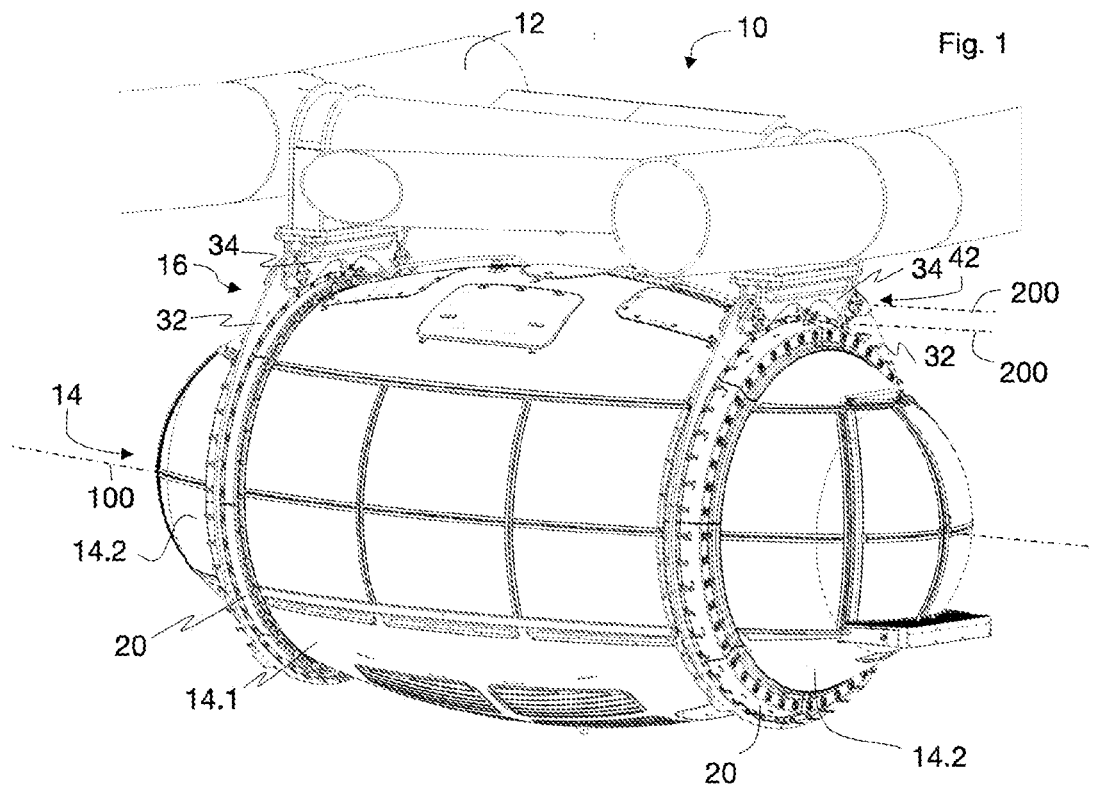
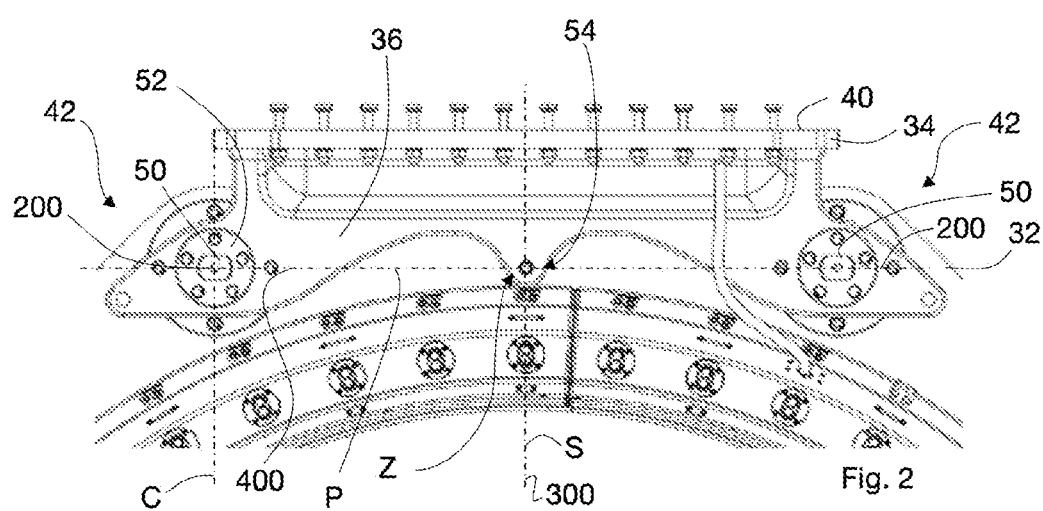

FERRIS WHEEL INSTALLATION COMPRISING A GUIDE STRUCTURE FOR GONDOLAS HAVING SLIDING BALL JOINTS

CROSS-REFERENCE TO RELATED APPLICATIONS

This application claims priority from French Patent Application No. 2107098, filed Jun. 30, 2021, the disclosure of which is incorporated herein by reference in its entirety.

FIELD

The present invention relates to a Ferris wheel installation comprising a wheel rim structure which is rotatable about a horizontal axis of revolution, and at least one gondola which is connected to the wheel rim structure by a guide structure so as to rotate with respect to the wheel rim structure about an axis of rotation which is parallel to the axis of revolution of the wheel rim structure and remote from the axis of revolution of the wheel rim structure, most often in order to maintain the attitude of the gondola during the revolution of the wheel rim.

BACKGROUND

An installation of this kind, which comprises gondolas which are each guided so as to rotate with respect to the wheel rim of the Ferris wheel, by a large-diameter bearing that surrounds the gondola, is described in the document DE476892.

WO2012/140330 describes a device for mounting the gondolas used in these installations. Said device comprises an outer ring which is rigidly connected to the wheel rim of the Ferris wheel, and a rotating inner ring which is rigidly connected to the gondola. These two rings may rotate relative to one another by virtue of a spacer bearing. The outer ring comprises three lugs which are coplanar and are angularly offset, which ensures the support of the gondola on the wheel rim.

For installations of larger dimensions, intended for receiving a large number of passengers, it is possible to provide for guiding the gondolas so as to rotate with respect to the wheel rim, by using two coaxial bearings of large diameters, which are spaced apart from one another, as described for example in the document FR3088014.

When the bearing(s) of a gondola are connected to the wheel rim of the Ferris wheel by a plurality of anchoring points, there are risks of errors in the alignment of the axis of rotation of the gondola with respect to the axis of revolution of the wheel rim of the Ferris wheel, or, in the case of gondolas guided by two bearings, a risk of error in the alignment of the axes of rotation of the two bearings. Such alignment errors generate stresses and wear which are prejudicial to the longevity of the installation. However, correcting these alignment errors during assembly of the gondolas on the wheel rim of the Ferris wheel is time-consuming and particularly delicate, given the dimensions of the apparatus.

The difficulties are accentuated further when the assembly of the gondolas is envisaged during renovation of an installation, of which the pre-existing wheel rim of the Ferris wheel does not necessarily meet the same specifications as the gondolas in terms of dimensional tolerance and may have worked during prior service periods.

Alignment errors may also be encountered after the assembly, on account, for example, of deformations of the wheel rim of the Ferris wheel over time, whether these be permanent and due to ageing, or cyclical, in particular on account of thermal expansions.

DISCLOSURE OF THE INVENTION

In this context, the aim of the invention is that of proposing a technical solution which makes it possible to limit the stresses generated in the region of the interface between the gondolas and the wheel rim of the Ferris wheel.

This aim is achieved according to the invention by a Ferris wheel installation comprising a wheel rim structure which is rotatable about a horizontal axis of revolution, and at least one gondola which is connected to the wheel rim structure by a guide structure comprising at least one bearing. Said guide structure allows the gondola to rotate with respect to the wheel rim structure about an axis of rotation which is in parallel or substantially parallel to the axis of revolution of the wheel rim structure and remote from the axis of revolution of the wheel rim structure.

According to the invention, the bearing is connected to the wheel rim structure by two sliding ball joints which have slide axes that are parallel to one another and spaced apart from one another. A sliding ball joint connection offers three degrees of rotational freedom and one degree of translational freedom. The sliding ball joints provide the bearing with a freedom of positioning and orientation in space, with respect to the wheel rim structure, such that the rotation of the gondola with respect to the wheel rim structure does not cause any significant stresses at the interface between the bearing and the wheel rim structure.

In practice, the bearing comprises at least two opposing raceways which are guided, relative to one another, so as to rotate about the axis of rotation of the bearing, a first of the two raceways being rigidly connected to the gondola, and a second of the two raceways being rigidly connected to a support which is connected to the wheel rim structure by the sliding ball joints. The raceways may be formed by bearing rings which are integral or in multiple parts. According to an embodiment, the first of the two raceways is an outer raceway of the bearing, while the second of the two raceways is an inner raceway of the bearing. The reverse is also possible.

In practice, a reference position of the guide structure exists, in which the axis of rotation of the bearing is parallel to the slide axes of the sliding ball joints. Preferably, the axis of rotation of the bearing is equidistant from the slide axes, in the reference position.

The two ball joints together provide the bearing with a freedom of movement with respect to the wheel rim structure. Preferably:
  in the first contact position, the bearing is free to pivot about a tilt axis which is coplanar with the slide axes and perpendicular to the slide axes, and/or
  in the first contact position, the bearing is free to pivot about a pivot axis which is secant with the axis of rotation of the gondola. In practice, this movement is accompanied by a translation of the sliding ball joints in opposing axial directions.

According to an embodiment, the guide structure comprises a stop device which comprises at least one first stop which is rigidly connected to the bearing opposite a first counter-stop which is rigidly connected to the wheel rim structure, the first stop and the first counter-stop being, in a first contact position, in contact with one another according to a first contact zone so as to limit a translational movement of the bearing with respect to the wheel rim structure, parallel to the slide axes, in a first direction of translation.

The first stop allows for a transmission of stresses from the gondola to the wheel rim structure, in particular stresses due to the wind.

The first contact zone is preferably located at less than 10 cm from a plane containing the slide axes, and/or at less than 10 cm from a median plane between the two slide axes.

According to an embodiment, the stop device comprises at least one second stop which is rigidly connected to the bearing opposite a second counter-stop which is rigidly connected to the wheel rim structure, the second stop and the second counter-stop being, in a second contact position, in contact according to a second contact zone so as to limit a translational movement of the bearing with respect to the wheel rim structure, parallel to the slide axes, in a second direction of translation which is opposite the first direction of translation.

According to an embodiment, the stop device allows for translation of the bearing with respect to the wheel rim structure, parallel to the axis of rotation of the gondola, having an axial clearance between the first contact position and the second contact position. According to an alternative embodiment, the first contact position is coincident with the second contact position, and the stop device prohibits any translation of the bearing with respect to the wheel rim structure, parallel to the axis of rotation of the gondola.

According to an embodiment of the invention, each sliding ball joint comprises a plain bearing. According to another embodiment, each sliding ball joint comprises a ball joint bearing, for example a spherical bearing.

According to an embodiment, the wheel rim structure comprises two parallel shields which define a spacer recess in which a portion of a support, rigidly connected to the bearing, and the two sliding ball joints, are received. Preferably, the two shields belong to a common plate which is fixed to a wheel rim of the wheel rim structure. The counter-stop(s) which limit the translational movements of the bearing are preferably rigidly connected to said common plate.

According to an embodiment, the guide structure comprises at least one additional bearing which defines an axis of rotation, the additional bearing being rigidly connected to the gondola and connected to the wheel rim structure, preferably by two additional sliding ball joints which have slide axes that are parallel to and spaced apart from one another, the additional bearing being at a distance from the bearing, measured parallel to the axis of rotation of the gondola, that is greater than 1 meter.

In practice, the additional bearing comprises at least two additional opposing raceways which are guided, relative to one another, so as to rotate about the axis of rotation of the additional bearing, a first of the two additional raceways being rigidly connected to the gondola, and a second of the two additional raceways being rigidly connected to a support which is connected to the wheel rim structure by the additional sliding ball joints.

Preferably, the slide axes of the two additional sliding ball joints are parallel to the axis of rotation of the additional bearing. Preferably, the slide axes of the two additional sliding ball joints are each coincident with one of the slide axes of the two sliding ball joints, within manufacturing tolerances.

The two additional ball joints together provide the additional bearing with a freedom of movement with respect to the wheel rim structure. In particular:

in the additional contact position, the additional bearing is free to pivot about an additional tilt axis which is coplanar with the additional slide axes and perpendicular to the additional slide axes, and/or in the additional contact position, the additional bearing is free to pivot about an additional pivot axis which is secant with the axis of rotation of the additional bearing.

According to an embodiment, the guide structure comprises an additional stop device which comprises at least one first additional stop which is rigidly connected to the additional bearing opposite a first additional counter-stop which is rigidly connected to the wheel rim structure, the first additional stop and the first additional counter-stop being, in a first additional contact position, in contact according to a first additional contact zone so as to limit a translational movement of the additional bearing with respect to the wheel rim structure, parallel to the slide axes, in a first direction of translation, the additional stop and the additional counter-stop being, in an additional contact position, in contact according to a contact zone, such that: the contact zone is located at less than 10 cm from a plane containing the slide axes, and/or the contact zone is located at less than 10 cm from a median plane between the two slide axes.

According to an embodiment, the gondola comprises a central part in the shape of a cylinder, and two lateral parts in the shape of a nose cone, the first raceways being mounted at the connection between the central part and the lateral parts.

BRIEF DESCRIPTION OF THE DRAWINGS

Other features and advantages of the invention will become clear from the following description, given with reference to the accompanying drawings and explained below.

FIG. 1 is a perspective view of a part of a Ferris wheel installation according to an embodiment of the invention, which in particular makes it possible to show a wheel rim of a Ferris wheel, a gondola, and a guide structure of the gondola.

FIG. 2 is a front view of a detail of the guide structure.

For reasons of improved clarity, identical or similar elements are indicated by identical reference signs in the text and in the drawings. The embodiment of the invention, shown in the accompanying drawings and described below, is given merely by way of non-limiting example.

DETAILED DESCRIPTION

Figure 3:
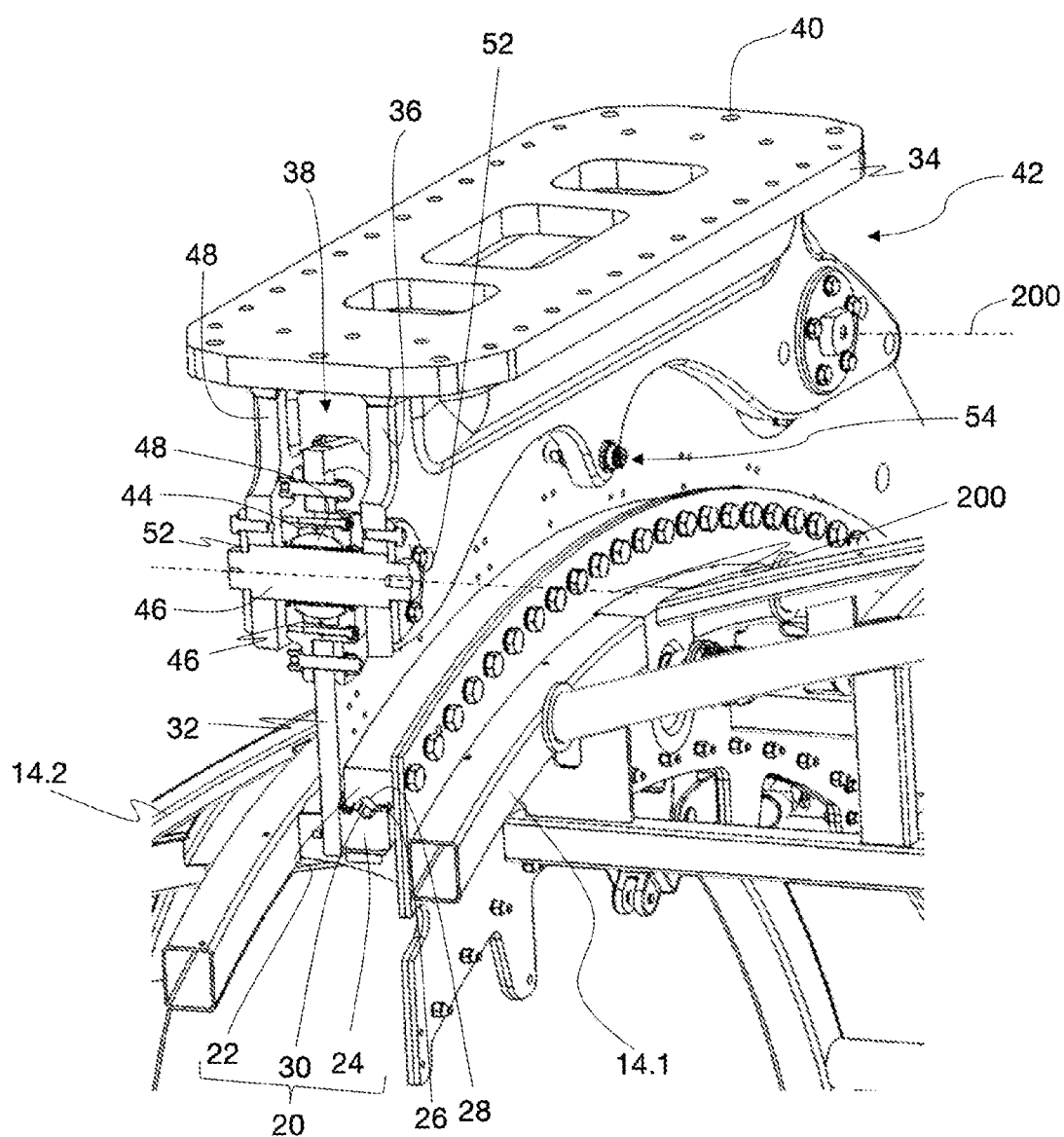
FIG. 3 is a perspective sectional view of a detail of the guide structure.
Figure 4:
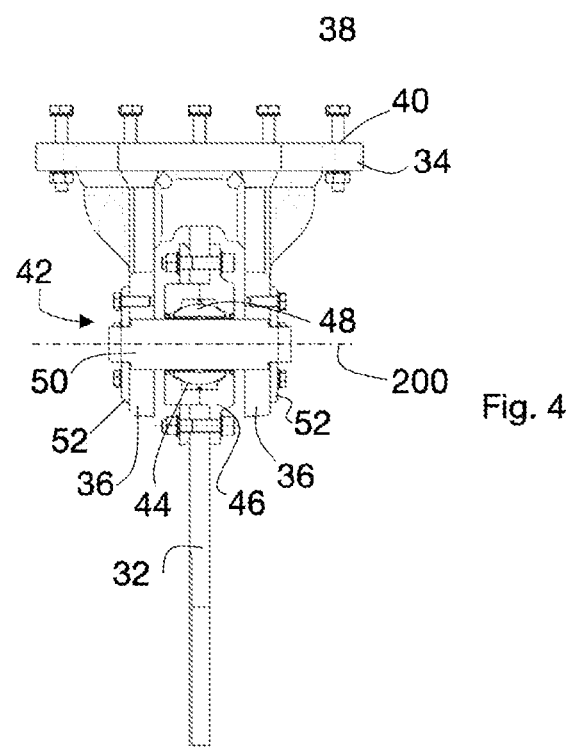
FIG. 4 is a cross-sectional view of a sliding ball joint of the guide structure, according to a cutting plane C shown in FIG. 3.

FIG. 1 shows a part of a Ferris wheel installation 10 comprising a wheel rim structure 12 which is rotatable about a horizontal axis of revolution, and a gondola 14 which is connected to the wheel rim structure 12 by a guide structure 16 so as to rotate with respect to the wheel rim structure 12 about an axis of rotation which is parallel to the axis of revolution of the wheel rim structure 12 and remote from the axis of revolution of the wheel rim structure 12.

By way of example, the gondola 14 may have an oblong structure, formed for example of a central part 14.1 forming a cylinder, surrounded by two end parts 14.2 in the shape of a nose cone. The gondola 14 shown is of large dimensions and makes it possible to receive a significant number of passengers, a dozen or more, seated or standing.

The guide structure 16 of the gondola 14 comprises at least one bearing 20, and preferably two bearings 20, which are located in planes remote from one another, ideally in parallel, such that the axes of rotation 100 of the bearings are ideally coincident, and together define the axis of rotation of the gondola. In the embodiment, each of the bearings 20 is located in the joint plane between the central cylindrical part 14.1 and one of the nose cone-shaped end parts 14.2 of the structure of the gondola 14, and has a diameter of more than 1.5 meters, and preferably more than 2 meters.

Each bearing 20 comprises two bearing rings 22, 24 which form opposing raceways 26, 28 on which rolling elements 30 roll so as to guide a relative rotational movement between the two raceways 26, 28 about the axis of rotation 100 of the bearing 20. More specifically, a first ring 22 forming a first raceway 26 is rigidly connected to the gondola 10, while the second ring 24 forming the second raceway 28 is rigidly connected to a support 32 connected to a plate 34 that is rigidly connected to the wheel rim structure 12. In a variant, the support 32 and the ring 24 may form just one single piece.

The plate 34 is preferably formed in one piece, so as to have perfectly controlled dimensions, and comprises for example two parallel shields 36 which define therebetween a spacer recess 38 in which a portion of the support 32 is received. The plate 34 comprises an interface 40 for fixing to the body of the wheel rim structure 12.

The kinematic connection between the plate 34 and the support 32 is achieved by two sliding ball joints 42 having slide axes 200 which are parallel to one another and remote from one another. In the context of the invention, a sliding ball joint is a mechanical connection which ensures three degrees of rotational freedom about a center of rotation, as well as one degree of translational freedom from the center of rotation along a slide axis. For some applications, the movements according to the degrees of rotational freedom may, if applicable, be of a very small amplitude, for example less than 5°. The degree of translational freedom may in turn be of the order of 20 mm. However, these values are given by way of example, since they may vary considerably according to the geometrical defects observed for the structure of the capsule, or the dimensions of the capsule and of the bearings. Larger clearances are not excluded. The slide axes 200 of the two sliding ball joints 42 are preferably parallel to the axis of rotation 100 of the bearing 20 which they support, at least in a median reference position of the guide structure 16. Said sliding ball joints 42 are received between the two parallel shields 36 of the plate 34.

Each sliding ball joint 42 comprises, for example, a ring 44 which is received in a clevis 46 which is fixed to the support 32 and is intended to receive a plain bearing 48 which is at least partially spherical and slides on a shaft formed for example by a pin 50 that is rigidly connected to the two parallel shields 36, for example by two flanges 52. The ring 44, rigidly connected to the clevis 46, comprises a concave slide track having a spherical casing and a profile that is complementary to the outer profile of the plain bearing 48, so as to be able to rotate about the center of the bearing 48, which can itself move along the axis 200 of the pin 50.

The slide axes 200 defined by the pins 40 are parallel. Each sliding ball joint 42 provides the connection between the support 32 and the plate 34 with three degrees of rotational freedom and one degree of translational freedom parallel to the axis 200 of the pin 50, which makes it possible to correct the possible offsets between the supports 32 or between the axes of rotation 100 of the two bearings 20.

Figure 5:
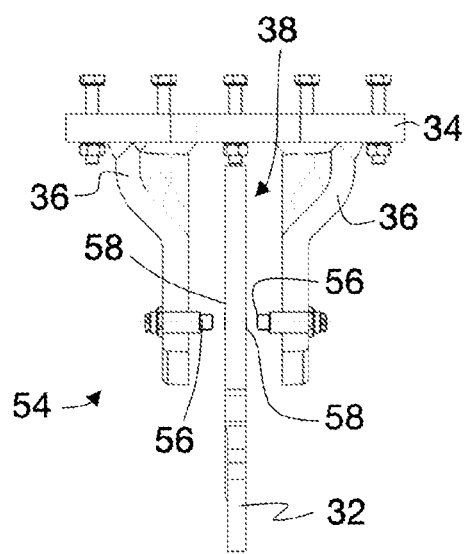
FIG. 5 is a cross-sectional view of a stop device of the guide structure, according to a cutting plane S shown in FIG. 3.

The guide structure 16 comprises, for at least one of the supports 32, and in this case for the two supports 32, a stop device 54 which is preferably received between the two shields 36 of the plate 34. Each stop device 54 (one of which is illustrated in FIG. 5, and the other in FIG. 6) comprises two stops 56 which are rigidly connected to one of the shields 36 of the plate 34, each opposite a counter-stop 58 which is rigidly connected to the support 32, and thereby rigidly connected to the wheel rim structure 12. A first of the stops 56 comes into contact with the counter-stop 58 facing it in a first contact position, in order to limit a translational movement of the support 32 with respect to the wheel rim structure 23, parallel to the slide axes 200, in a first direction of translation. In a similar manner, the second of the stops 56 comes into contact with the counter-stop 58 facing it in a second contact position, in order to limit a translational movement of the support 32 with respect to the wheel rim structure 12, parallel to the slide axes 200, in a second direction of translation which is opposite to the first.

In each of the contact positions, the contact zone Z (indicated in FIG. 2) between the stop 56 in question and the corresponding counter-stop 58 is positioned approximately halfway between the sliding ball joints 42. To give an idea, the center of each contact zone Z is preferably located at less than 10 cm from a plane P containing the slide axes, and preferably at less than 10 cm from a median plane of symmetry S between the two slide axes 200.

In this embodiment where each support 32 is associated with a stop device 54, it is possible to provide for at least one of the two supports 32, the stops 56, and counter-stops 58 to be arranged such that the first contact position is not coincident with the second contact position, as shown in FIG. 5; in other words, such that the support 32 is movable in translation with respect to the plate 34, parallel to the slide axes 200, over a few millimeters, between the first contact position and the second contact position. The corresponding support 32 is thus free to move in translation with respect to the wheel rim structure 12, parallel to the slide axes 200, to pivot about an imaginary pivot axis 300 that is perpendicular to the plane P containing the slide axes and secant with the axis of rotation of the bearing 100, and to pivot about an imaginary tilt axis 400 passing through the centers of rotation of the sliding ball joints 42.

Figure 6:
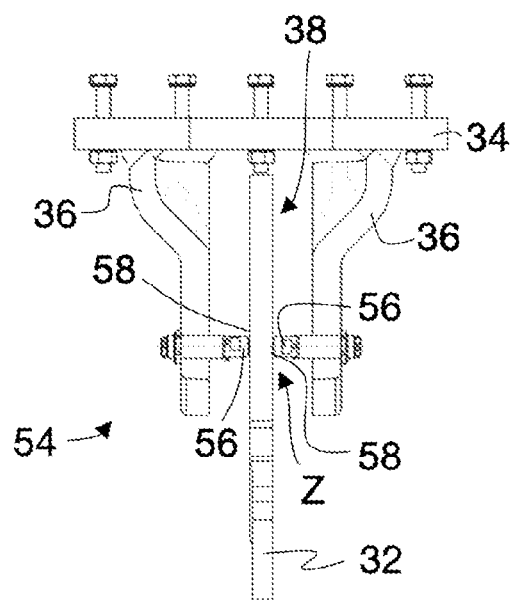
FIG. 6 is a cross-sectional view of an additional stop device of the guide structure.

For the other support 32, the first contact position and the second contact position are preferably coincident, as shown in FIG. 6, such that any translation of the support 32 with respect to the wheel rim structure 12 is prohibited.

The sliding ball joints 42 make it possible to correct the alignment errors, in particular between the two bearings 20, in order to reduce the redundancy of the installation and to minimize the mechanical stresses. The stop devices 54, in turn, make it possible to limit the axial clearances of the gondola 14 to that which is required for compensating the alignment errors, and to absorb the axial stresses, for example due to the wind.

Each stop device 54 can be adjusted as needed, by increasing or reducing, or indeed eliminating, the corresponding axial clearance.

According to a variant that is not shown, just one of the two supports 32 is connected to the wheel rim structure by sliding ball joints 42, the other support 32 having no degree of freedom.

According to another variant, the guide structure 16 is equipped with a single plate for ensuring the connection of the two supports 32 to the wheel rim structure 12.

The invention claimed is:

1. A Ferris wheel installation comprising: a wheel rim structure which is rotatable about a horizontal axis of revolution, and at least one gondola which is connected to the wheel rim structure by a guide structure comprising a bearing which defines an axis of rotation of the bearing, the bearing comprising at least two opposing raceways which are guided, relative to one another, so as to rotate about the axis of rotation of the bearing, a first of the two raceways being rigidly connected to the gondola, and a second of the two raceways being rigidly connected to a support, wherein the support is connected to the wheel rim structure by two sliding ball joints, each of which provides three degrees of rotational freedom and one degree of translational freedom along a slide axis, the slide axes of the two sliding ball joints being parallel to one another and remote from one another.

2. The Ferris wheel installation of claim 1, wherein in a median reference position, the axis of rotation of the bearing is parallel to the slide axes of the two sliding ball joints.

3. The Ferris wheel installation of claim 2, wherein in the median reference position, the axis of rotation of the bearing is equidistant from the slide axes of the two sliding ball joints.

4. The Ferris wheel installation of claim 1, wherein the guide structure comprises a stop device which comprises at least one first stop which is rigidly connected to the wheel rim structure opposite a first counter-stop which is rigidly connected to the bearing, the first stop and the first counter-stop being, in a first contact position, in contact according to a first contact zone so as to limit a translational movement of the bearing with respect to the wheel rim structure, parallel to the slide axes of the two sliding ball joints, in a first direction of translation.

5. The Ferris wheel installation of claim 4, wherein the first contact zone has a center that is located less than 10 cm from a plane containing the slide axes of the two sliding ball joints, or less than 10 cm from a median plane between the slide axes of the two sliding ball joints.

6. The Ferris wheel installation of claim 4, wherein the stop device comprises at least one second stop which is rigidly connected to the wheel rim structure opposite a second counter-stop which is rigidly connected to the bearing, the second stop and the second counter-stop being, in a second contact position, in contact so as to limit a translational movement of the bearing with respect to the wheel rim structure, parallel to the slide axes of the two sliding ball joints, in a second direction of translation opposite the first direction of translation.

7. The Ferris wheel installation of claim 6, wherein the stop device allows for axial translation of the bearing, with respect to the wheel rim structure, parallel to the axis of rotation of the bearing, having an axial clearance between the first contact position and the second contact position.

8. The Ferris wheel installation of claim 6, wherein the first contact position is coincident with the second contact position, the stop device prohibiting any axial translation of the bearing, with respect to the wheel rim structure, parallel to the axis of rotation of the bearing.

9. The Ferris wheel installation of claim 1, wherein the guide structure comprises an additional bearing which defines an axis of rotation of the additional bearing, the additional bearing being at a distance from the bearing, measured parallel to the axis of rotation of the bearing, of more than 1 meter, the additional bearing comprising at least two additional opposing raceways which are guided, relative to one another, so as to rotate about the axis of rotation of the additional bearing, a first of the two additional raceways being rigidly connected to the gondola, and a second of the two additional raceways being rigidly connected to a support which is connected to the wheel rim structure by the additional sliding ball joints.

10. The Ferris wheel installation of claim 9, wherein the additional bearing is connected to the wheel rim structure by two additional sliding ball joints, each of which provides three degrees of rotational freedom and one degree of translational freedom along a slide axis, the slide axes of the two additional sliding ball joints being parallel to one another and spaced apart from one another.

11. The Ferris wheel installation of claim 10, wherein the slide axes of the two additional sliding ball joints are parallel to the axis of rotation of the additional bearing.

12. The Ferris wheel installation of claim 10, wherein the guide structure comprises an additional stop device which comprises at least one first additional stop which is rigidly connected to the wheel rim structure opposite a first additional counter-stop which is rigidly connected to the additional bearing the first additional stop and the first additional counter-stop being, in a first contact position, in contact so as to limit a translational movement of the additional bearing with respect to the wheel rim structure, parallel to the slide axes of the two additional sliding ball joints, in a first direction of translation.

13. The Ferris wheel installation of claim 12, wherein the additional stop device allows for axial translation, parallel to the axis of rotation of the additional bearing, of the additional bearing with respect to the wheel rim structure.

14. The Ferris wheel installation of claim 12, wherein the additional stop device prohibits any axial translation, parallel to the axis of rotation of the additional bearing, of the additional bearing with respect to the wheel rim structure.

15. The Ferris wheel installation of claim 1, wherein the bearing has a pitch diameter of greater than 1.5 meters, preferably greater than 2 meters.

* * * * *